(12) United States Patent
Jesse (10) Patent No.: US 6,837,446 B1
(45) Date of Patent: Jan. 4, 2005

(54) UNITARY BOOM STRUCTURE

(75) Inventor: Lynn Jesse, Urbandale, IA (US)

(73) Assignee: Sprayer Specialties, Inc., Grimes, IA (US)

( * ) Notice: Subject to any disclaimer, the term of this patent is extended or adjusted under 35 U.S.C. 154(b) by 33 days.

(21) Appl. No.: 10/345,795

(22) Filed: Jan. 16, 2003

(51) Int. Cl.⁷ ................................................ B05B 1/20
(52) U.S. Cl. ................ 239/161; 239/159; 239/163; 239/172; 239/280; 52/634; 52/650.1
(58) Field of Search ................................. 239/159, 161, 239/163, 165, 170, 172, 280; 52/634, 731.2, 731.3, 737.6, 650.1, 652.1, 115

(56) References Cited

U.S. PATENT DOCUMENTS

| | | | | |
|---|---|---|---|---|
| 1,645,060 A | * | 10/1927 | Kraft | 52/634 |
| 1,656,810 A | * | 1/1928 | Arnstein | 52/634 |
| 1,656,871 A | * | 1/1928 | Schnitzer | 52/634 |
| 1,994,716 A | * | 3/1935 | Klemperer | 52/634 |
| 2,145,407 A | * | 1/1939 | Soule | 52/274 |
| 2,684,159 A | * | 7/1954 | Oldenkamp | 52/115 |
| D224,978 S | * | 10/1972 | Sterner | D34/36 |
| 3,887,132 A | * | 6/1975 | Widmer | 239/166 |
| 3,890,757 A | * | 6/1975 | Lamer et al. | 52/695 |
| 4,003,168 A | * | 1/1977 | Brady | 52/118 |
| 4,016,688 A | * | 4/1977 | Tiffin et al. | 52/118 |
| 4,138,063 A | * | 2/1979 | Batts | 239/168 |
| 4,171,598 A | * | 10/1979 | Holmes | 52/118 |
| 4,793,113 A | * | 12/1988 | Bodnar | 52/481.1 |
| 5,176,322 A | * | 1/1993 | Sartor | 239/77 |
| 5,310,115 A | * | 5/1994 | Broyhill | 239/168 |
| 5,426,906 A | * | 6/1995 | McCracken | 52/650.1 |
| 5,520,335 A | * | 5/1996 | Claussen et al. | 239/104 |
| 5,927,606 A | * | 7/1999 | Patterson | 239/167 |
| 5,971,295 A | * | 10/1999 | Jensen et al. | 239/77 |
| 2001/0042352 A1 | * | 11/2001 | Pudney | 52/726.2 |

\* cited by examiner

Primary Examiner—Patrick Brinson
(74) Attorney, Agent, or Firm—Camille L. Urban; G. Brian Pingel (57) ABSTRACT

The present invention comprises a sprayer boom and is incorporated in a spraying apparatus which includes a vehicle, a tank, hoses connected to nozzles, and the sprayer boom. The sprayer boom includes a number of wing sections each including at least one single-piece component cut from a sheet of metal to form a web or truss structure which replaces the usual rods and welds support provided to sprayer booms of this nature. Obtaining the single-piece component by cutting it from a sheet of metal rather than constructing the truss-structure by use of many rods reduces material and labor costs. Spaced apart rungs or tabs on the bottom of the sprayer boom provide openings through which sprayer nozzles are aimed while the nozzles, hoses and connectors remain mostly recessed within the boom which provides physical protection from wind and other damage and still allows easy access for repair.

19 Claims, 13 Drawing Sheets

UNITARY BOOM STRUCTURE

BACKGROUND OF THE INVENTION

1. Field of the Invention

The present invention relates in general to a device used to apply liquid herbicides, nutricides or pesticides to crops and, more specifically, to a sprayer boom through which the liquid is applied.

2. Description of the Prior Art

It is known in the art to use herbicides, nutricides and pesticides in dry or liquid form to improve the health of plants. Liquid form is often applied using a spraying apparatus by positioning a nozzle in the apparatus over a plant or group of plants and forcing the liquid through the nozzle such that it is dispersed in a mist or fine droplets. When using this type of apparatus on a field crop, it must be mounted on or otherwise attached to a tank which holds the liquid and a conveyance vehicle in order to provide a continuous mist or droplets and move it over and through the crop. Quite often, the spraying apparatus includes a sprayer boom on which nozzles are mounted and which extends beyond the width of the conveyance vehicle to maximize coverage with every pass and which can be folded in such a way as to allow for easy storage or transport.

The present invention differs from known sprayer booms in that these prior devices are constructed using many pieces that are welded together. Every weld of other sprayer booms connotes a weak point in the structure and, consequently, the maximum length and strength of the entire sprayer boom is necessarily lessened. In addition, these multiple-piece apparatuses require the manufacture of each piece including cutting, fabrication and assembly. In addition, other sprayer booms often position the nozzles in a manner that creates a vulnerability of the liquid mist or droplets to disturbance by wind or of the nozzles to physical damage. Such disturbance results in an uneven or unpredictable level of application of the liquid to the crop and in a degree of loss of liquid.

Finally, other sprayer booms are often assembled in a manner which results in restricted access to nozzles for adjustment, repair or placement.

It is therefore one object of the present invention to increase the strength of a sprayer boom by decreasing the number of welds and pieces necessary for construction.

It is a second object of the present invention to provide a sprayer boom which may be longer while maintaining adequate stability and strength.

It is a third object of the present invention to provide a sprayer boom made of fewer fabricated parts and fewer welds, thereby decreasing the amount of labor and costs encountered in its manufacture.

It is a fourth object of the invention to provide a sprayer boom constructed in such a way that nozzles delivering liquid are better protected from wind disturbance thereby increasing the efficiency and accuracy of the spraying apparatus.

It is a fifth objective of the present invention to provide protection of the nozzles from being bumped which may, at best, knock the nozzle out of alignment or, at worst, damage or eliminate the nozzle.

It is a sixth objective to provide a sprayer boom wherein nozzles are easily accessible for repair, replacement or adjustment.

Finally, it is a seventh object of the present invention to provide some or all of the above advantages while still providing a sprayer boom that can be easily folded for ease of transportation and storage.

SUMMARY

The present invention comprises a sprayer boom and is incorporated in a spraying apparatus which includes a vehicle, a tank, hoses connected to nozzles, and the sprayer boom. The sprayer boom includes a number of wing sections each of which are constructed using at least one single-piece component and a minimum of welds and spaced apart rungs or tabs on the bottom side. Larger wing sections are supported by a carrier beam. Each single-piece component is cut from a sheet of metal such that it includes at least one web or truss structure for support and, when associated with tabs or rungs, a bottom surface formed with apertures. Obtaining the component by cutting it from a sheet of metal rather than constructing the truss-structure by use of many rods and tubes and welding them together comprises a major improvement over other sprayer booms. The nozzles are aligned with the apertures and yet are at least partially recessed within the structure of the sprayer boom section. This arrangement effectively provides protection of the liquid flow from wind and the nozzle from physical damage which may occur during transportation, storage, or operation and is the second measurable improvement over other sprayer booms.

In a first embodiment, two single-piece components, each with a truss structure cut from a sheet of metal, and generally mirror image of the other, are bent such that an upper flange and a lower flange with tabs are perpendicular to a side surface comprising the truss structure of the component. The two single-piece components are positioned facing one another and the top flanges are associated with a carrier beam; the tabs of the bottom flanges are overlapped and secured so that apertures are formed between the overlapped tabs.

In a second embodiment of the invention, a single-piece component with two web or truss structures cut from a sheet of metal is bent in a U-shape with two arms and positioned over a carrier beam which supports the boom so that the truss structures fall on either side of the carrier beam each on one arm of the U-shape. Rungs are then connected between the arms of the U-shape such that apertures are formed between the rungs. The positions of the rungs can be altered to accommodate desired positions of the nozzles.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

BRIEF DESCRIPTION OF THE DRAWINGS

FIG. 2a is a side view of the wing section of FIG. 2;

DESCRIPTION OF THE PREFERRED EMBODIMENT(S)

Figure 1:
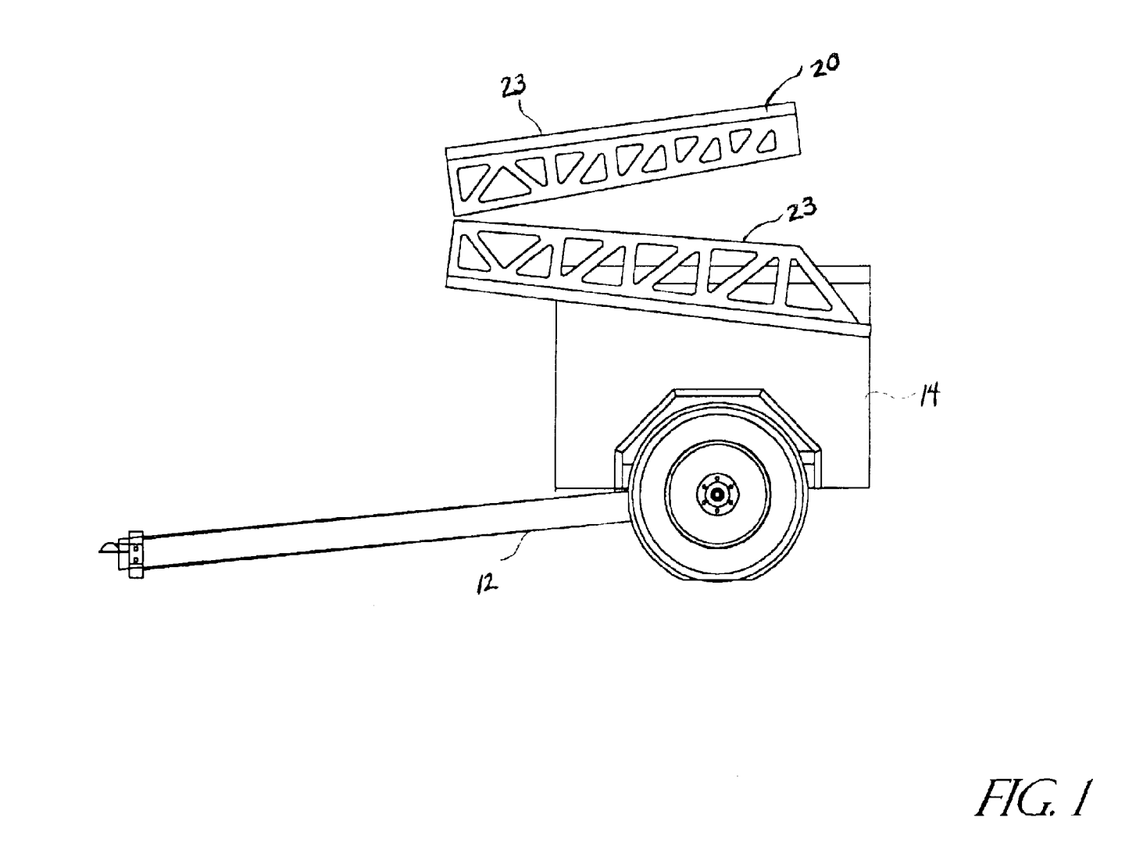
FIG. 1 is a perspective of a sprayer apparatus including the sprayer boom of the present invention.
Figure 5:
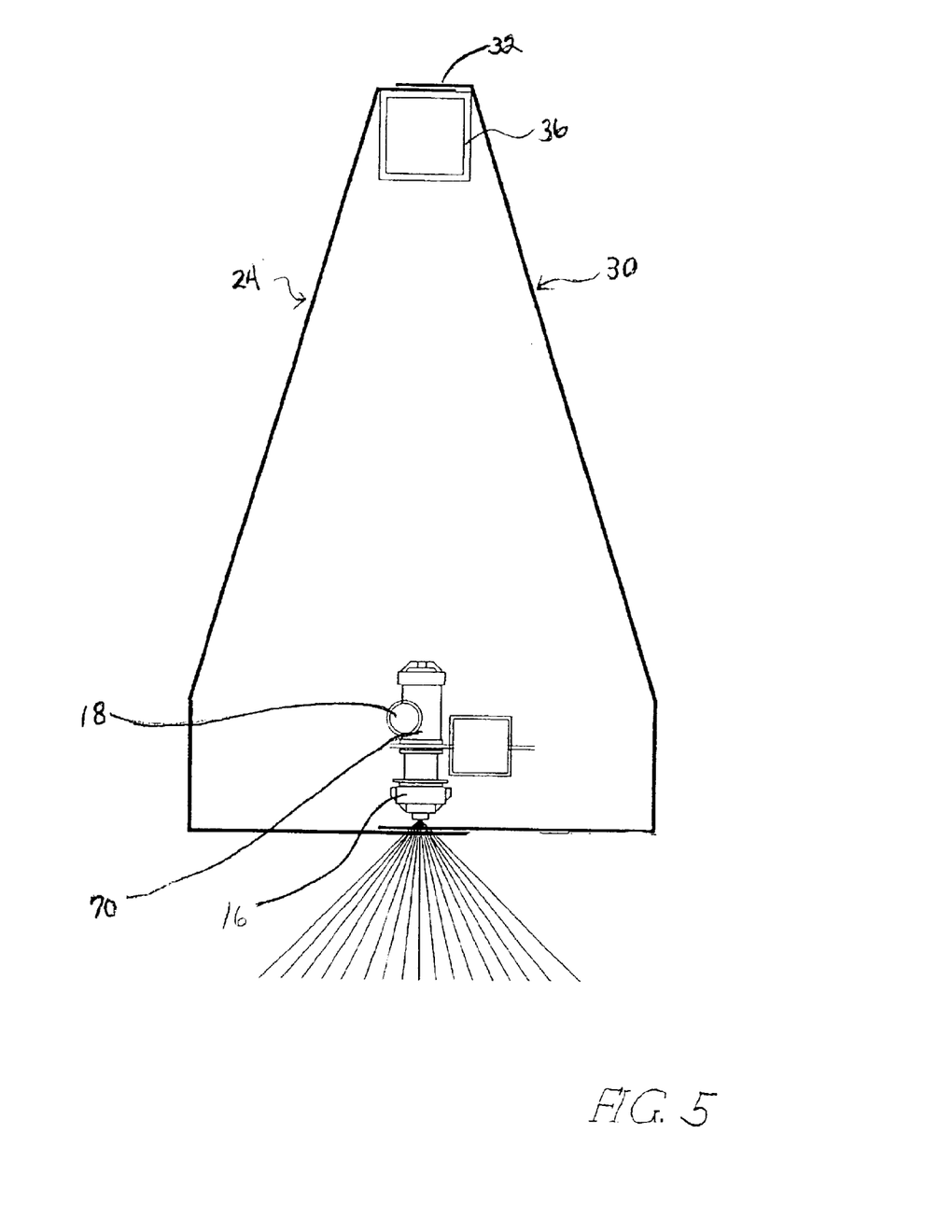
FIG. 5 is an end view of the embodiment of FIG. 2 which shows spray nozzle positioning.
Figure 7:
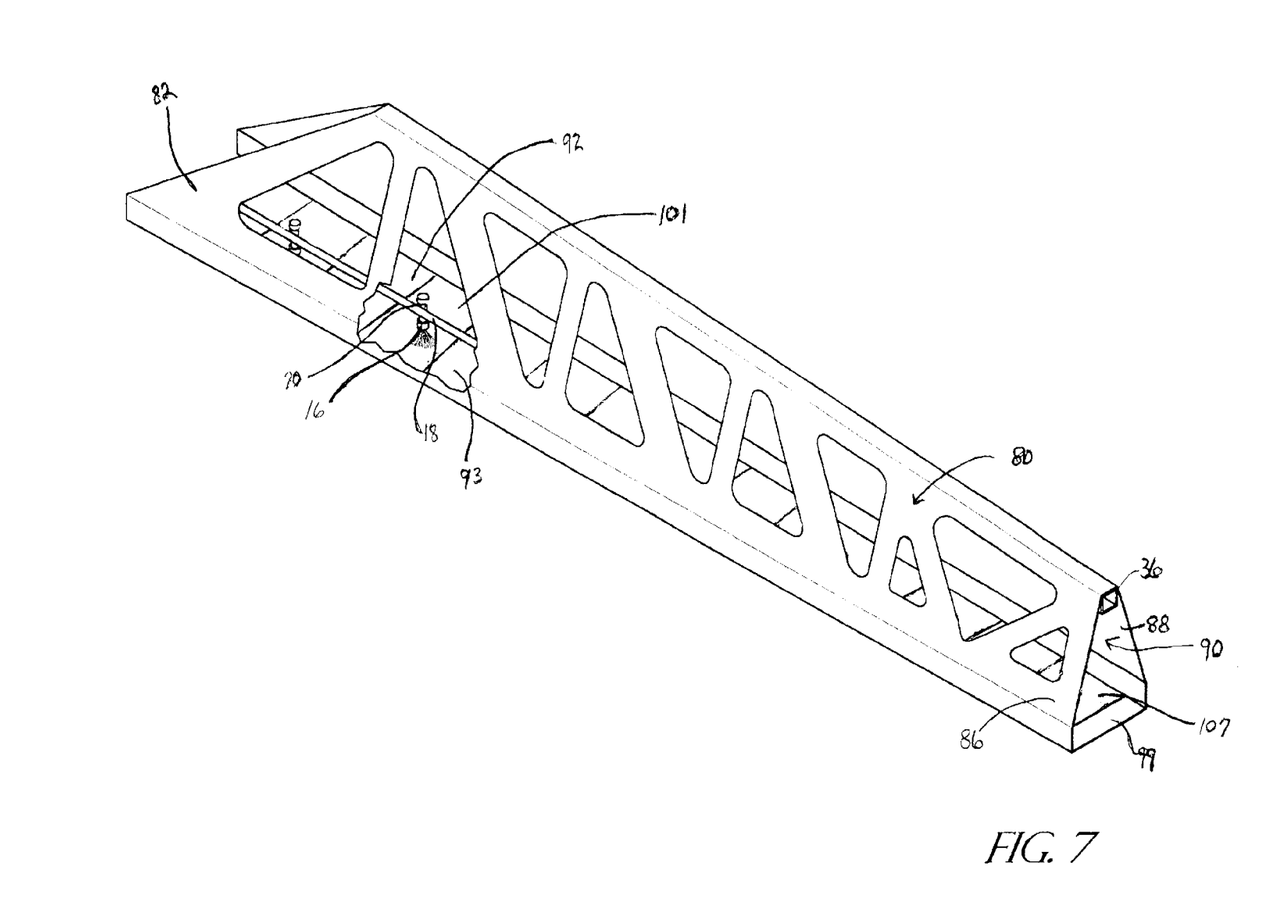
FIG. 7 is a perspective of one wing section of a second embodiment of the sprayer boom of the present invention.
Figure 7A:
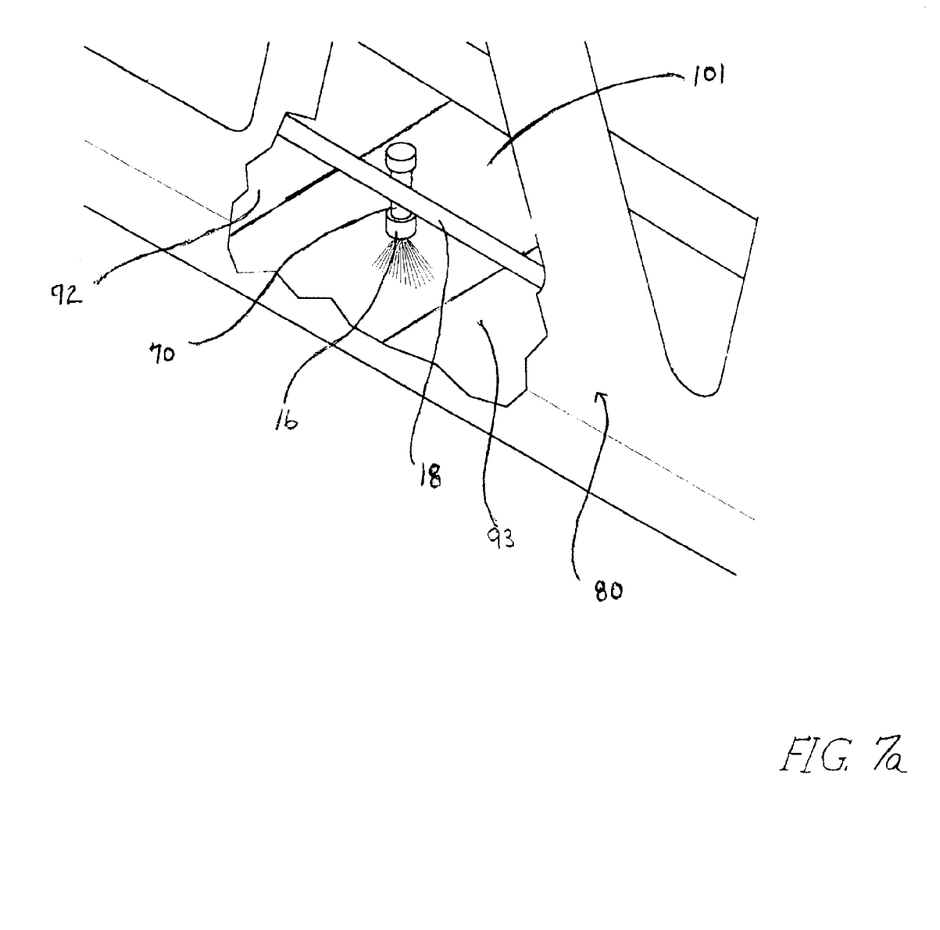
FIG. 7a is a expanded view of a cut out portion of FIG. 7 showing the position of the nozzle and hose.
Figure 8:
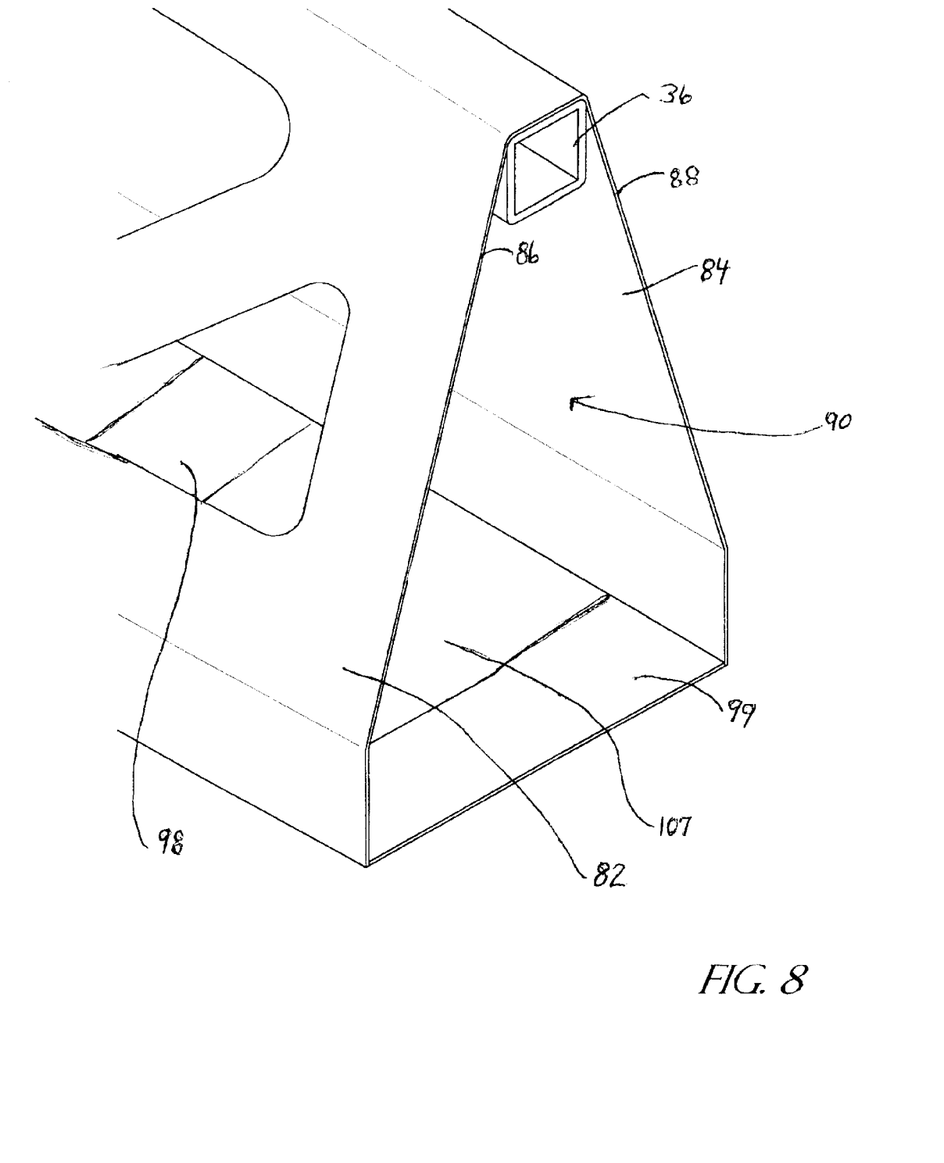
FIG. 8 is an expanded view along line 8—8 of FIG. 7.
Figure 9:
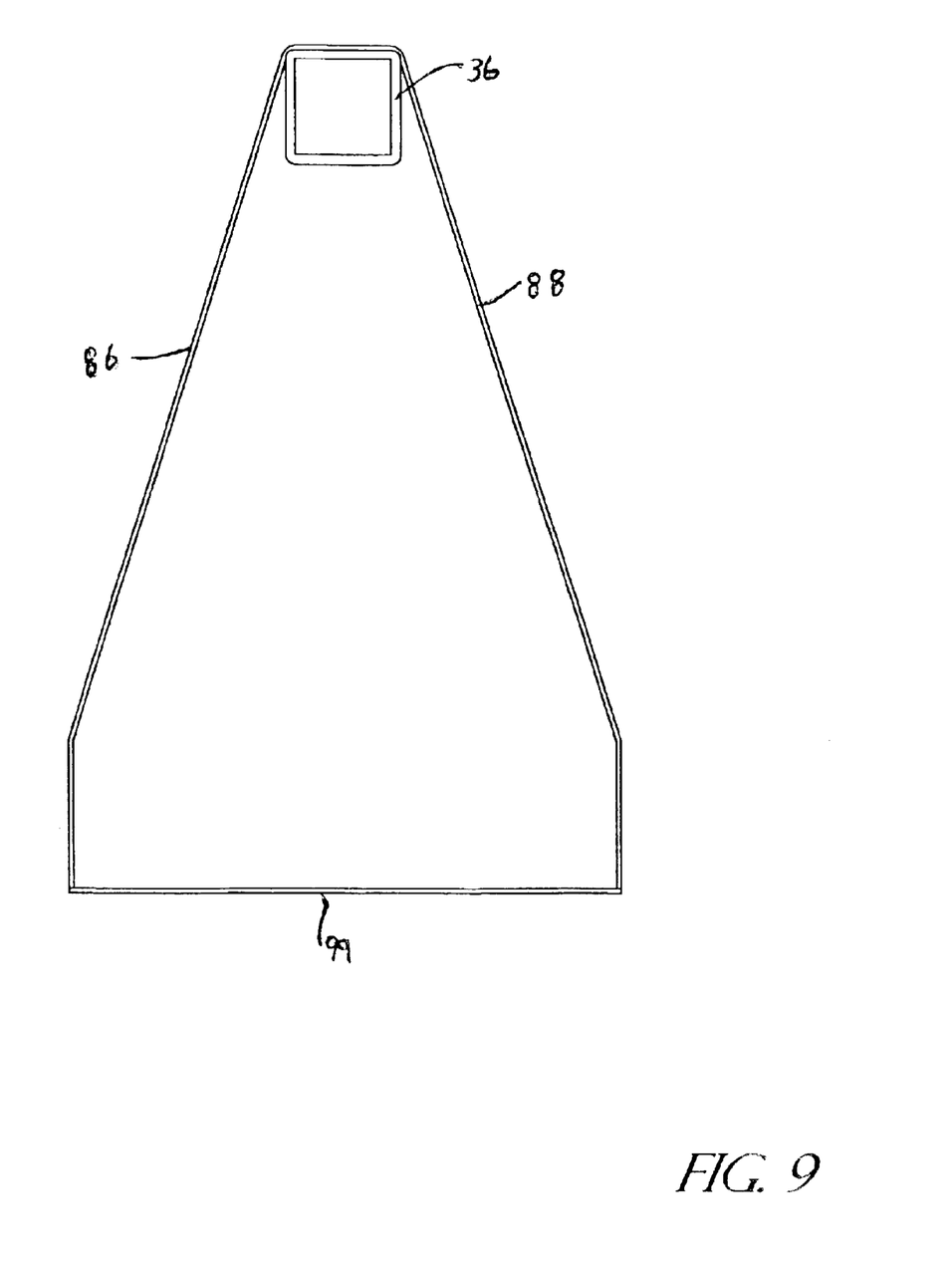
FIG. 9 is an end view of the wing section of FIG. 7.
Figure 10:
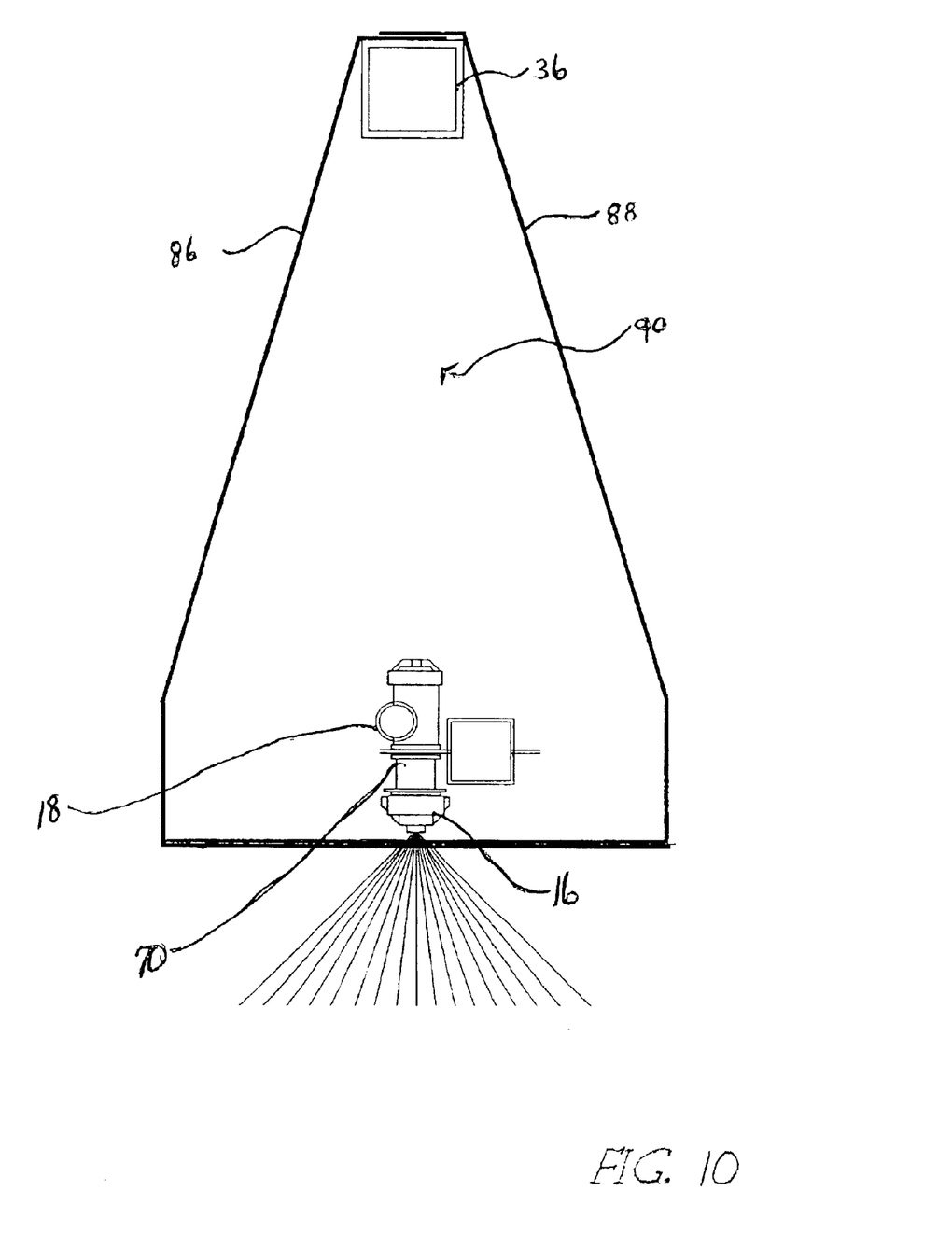
FIG. 10 is an end view of the wing section of FIG. 7 which shows spray nozzle positioning.
Figure 11:
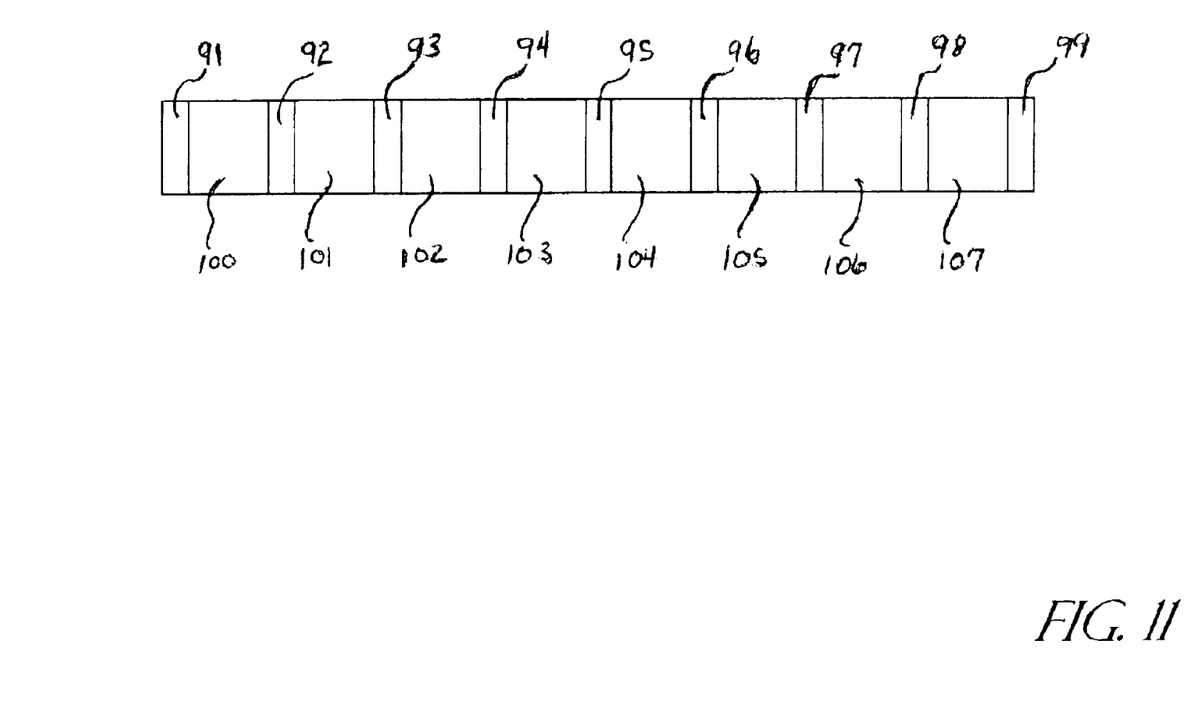
FIG. 11 is a bottom view of the wing section of FIG. 7.

A sprayer apparatus is shown generally in FIG. 1 as 10 including a wheeled vehicle 12, a tank 14, a plurality of nozzles 16 each connected to a hose 18, and a sprayer boom 20 of the present invention (for detail, please refer to FIGS. 5, 7a, and 10). The sprayer boom 20 comprises two sides, 21 and 22. Each side, 21 and 22, includes at least one wing section 23.

Figure 2:
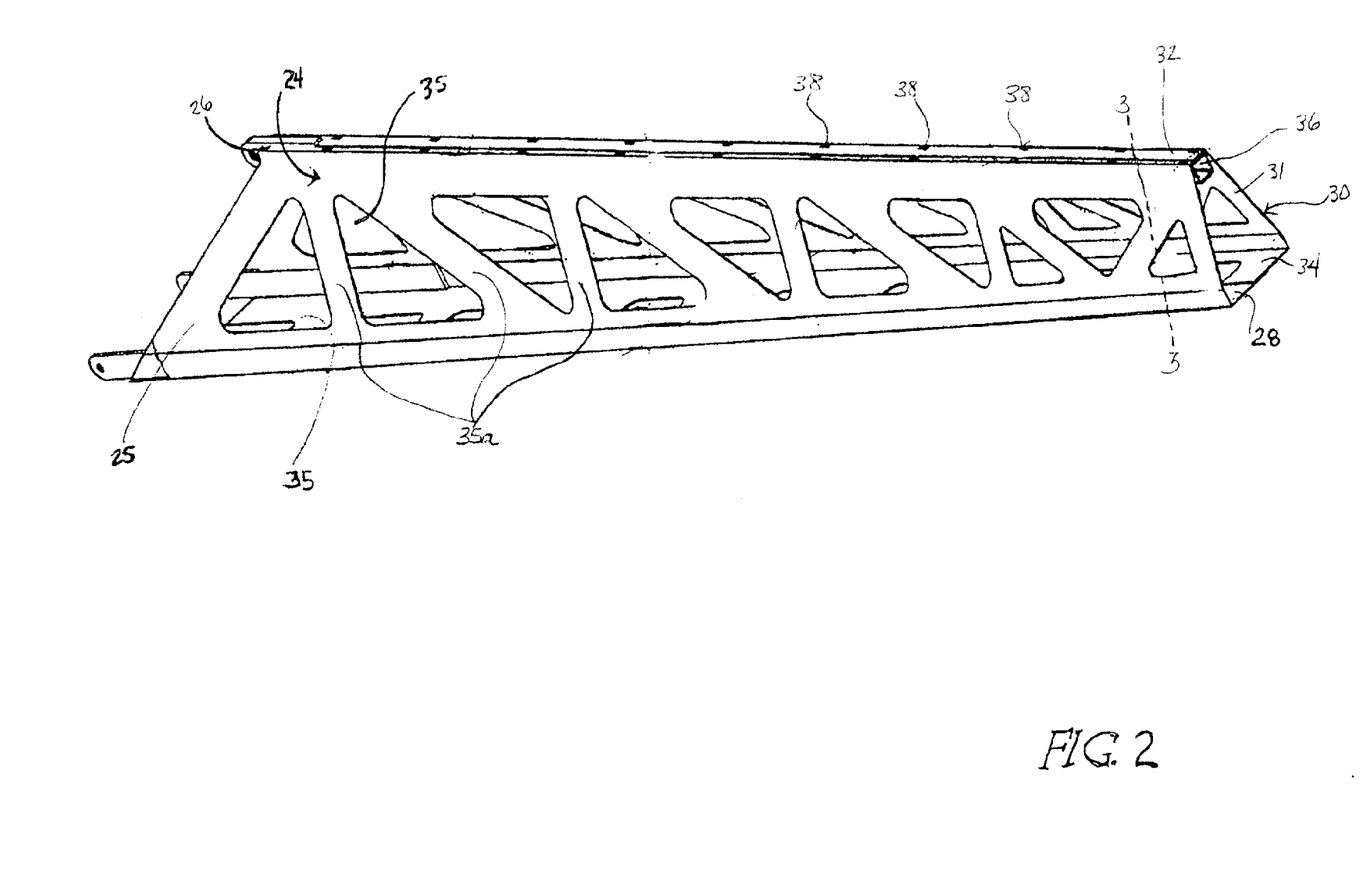
FIG. 2 is a perspective of one wing section of a first embodiment of the sprayer boom of the present invention.
Figure 3:
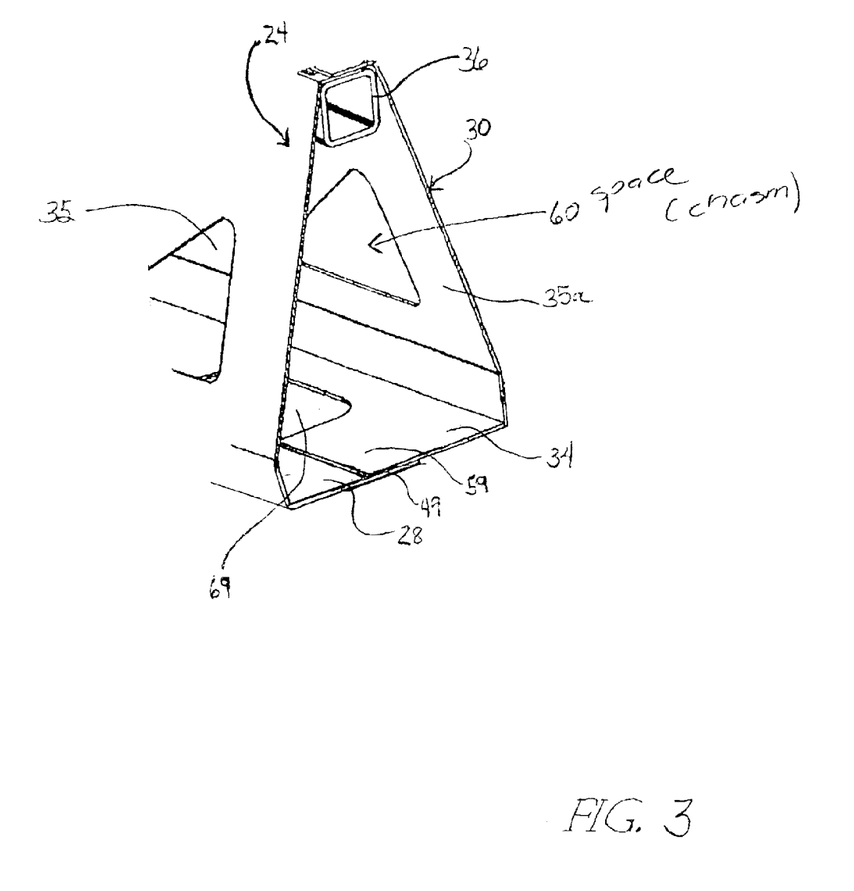
FIG. 3 is an expanded view along line 3—3 of FIG. 2.
Figure 3A:
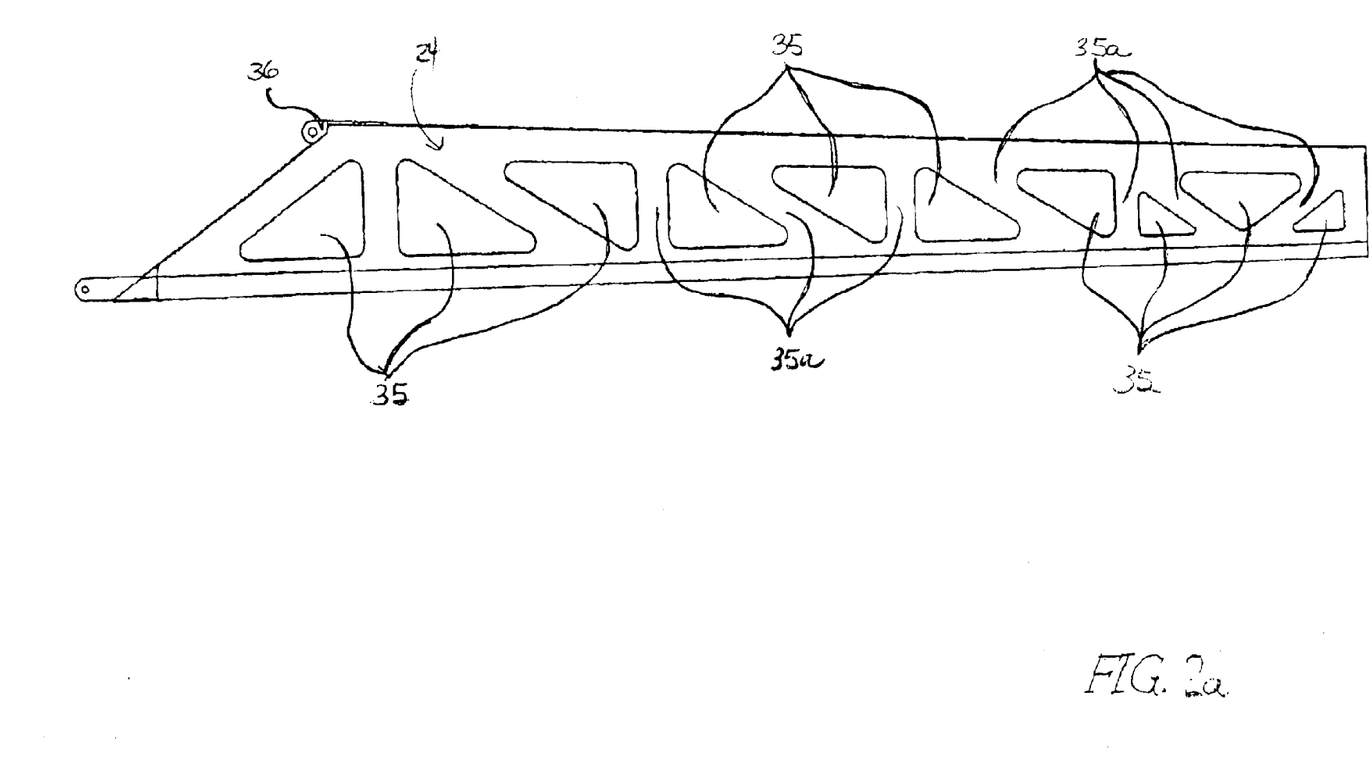
Figure 4:
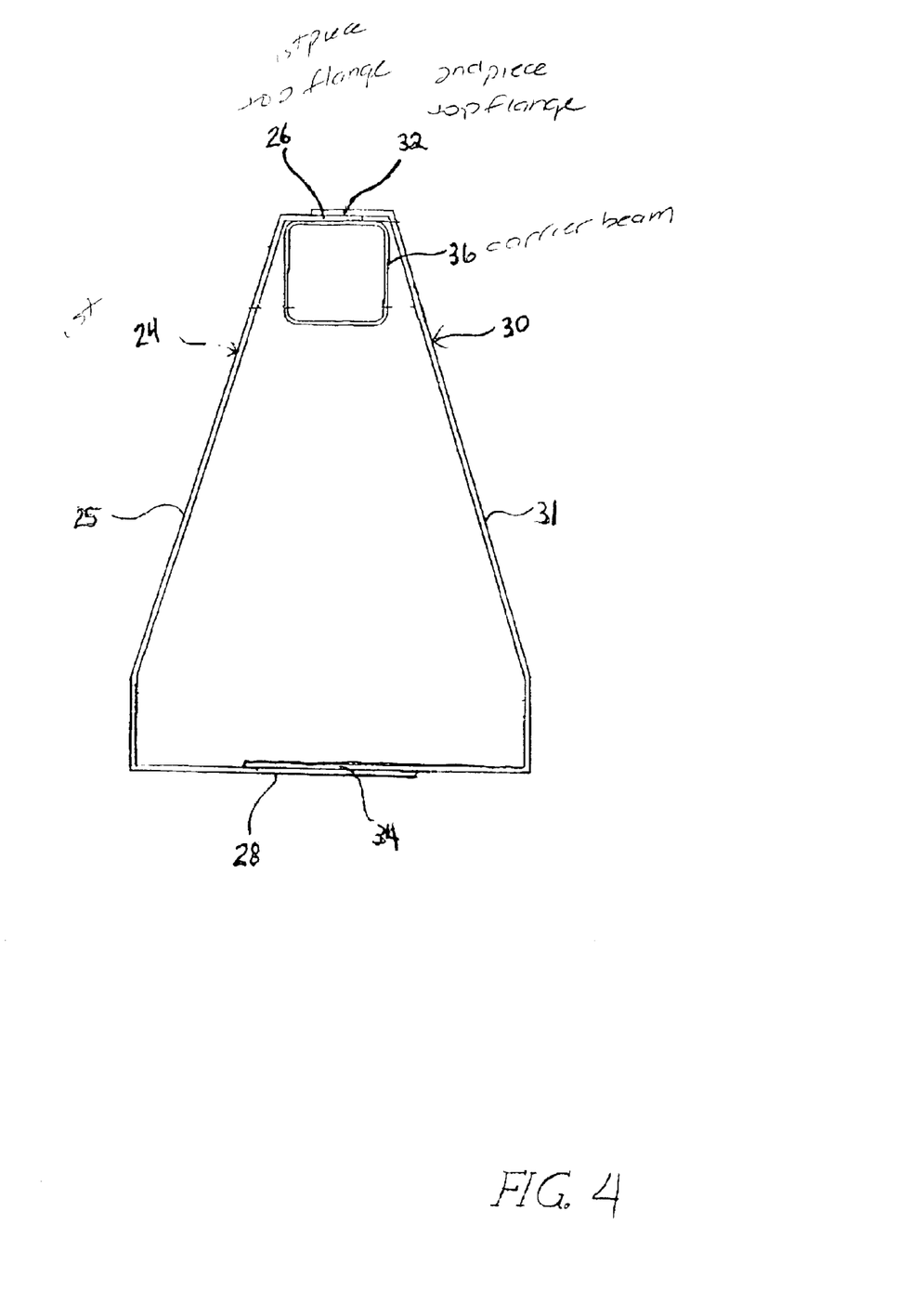
FIG. 4 is an end view of the sprayer boom embodiment of FIG. 2.

A first embodiment of the present invention comprises a first single-piece component 24 with a side surface 25, a top flange 26 and a bottom flange 28, a second single-piece component 30 with a side surface 31, a top flange 32 and a bottom flange 34, a carrier beam 36, and means 38 for associating said first single-piece component 24 and said second single-piece component 30 with said carrier beam 36. These elements are shown in FIGS. 2–4.

Referring now especially to FIG. 2a, said side surfaces 25 and 31 of said single piece components, 24 and 30, respectively, include a series of triangular openings 35 wherein each opening is an inverted triangle relative to the openings on either side of it and struts 35a are left between the openings to provide support. Such arrangement results in a web or truss structure which looks and functions in the manner of a series of trusses often seen on bridges and crane booms and similar to other sprayer booms, however, the single-piece components 24 and 30 of sprayer boom 20 of the present invention do not require a plurality of separately made braces or struts attached to a frame in order to form the trusses. Instead, these single-piece components including the truss structures are fabricated from a single piece of material. In the preferred embodiment, the single-piece components, including the truss-structures, are flame cut from metal. And, although triangular openings are disclosed here, it would be possible to use other shapes to achieve the necessary support.

Figure 6:
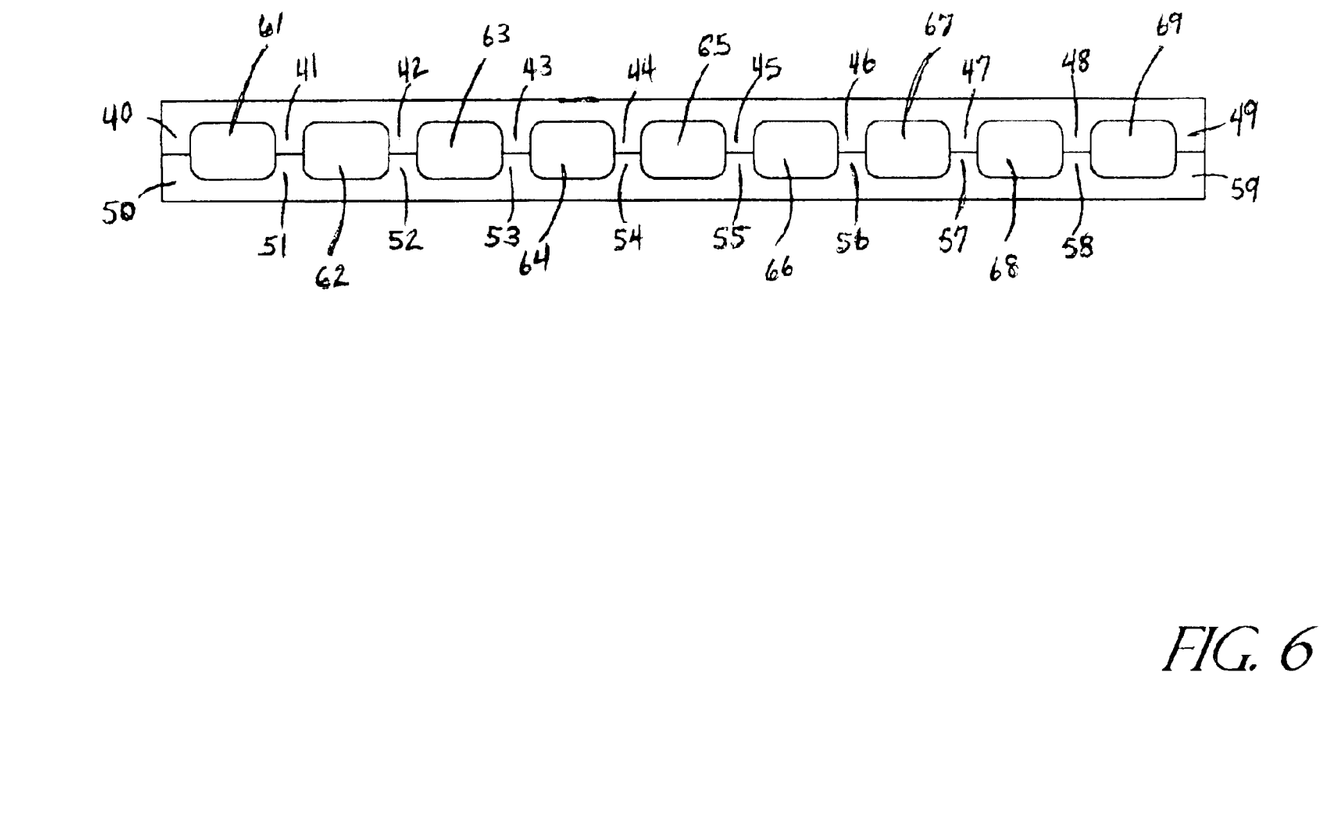
FIG. 6 is s a bottom view of the embodiment of FIG. 2.

Said first single-piece component 24 and said second single-piece component 30 are essentially mirror images of one another wherein said top flange 26 and bottom flange 28 extend in the same direction from and are both perpendicular to said side surface 25 and the top flange 32 and bottom flange 34 of side surface 31 also extend in the same direction from and perpendicular to side surface 31. Shown best in FIG. 6, said bottom flange 28 of said first single-piece component 24 comprises spaced apart tabs 40–49 and said bottom flange 34 of said second single-piece component 30 comprises spaced apart tabs 50–59.

When the wing section 23 of the sprayer boom 20 of the first embodiment is constructed, the first and second single-piece components, 24 and 30 respectively, are oriented facing one another leaving a space 60 therebetween. Said top flange 26 of said first single-piece component 24 and said top flange 32 of said second single-piece component 30 are positioned over the carrier beam 36 which is equipped with means to associate 38 said beam 36 with said single-piece components. Said tabs 40–49 of the bottom flange 28 of the first single-piece component overlap said tabs 50–59 of the bottom flange 34 of the second single-piece component 30 such that apertures 61–69 are formed between the overlapped tabs (See FIG. 6).

Each of said hoses 18 are connected to the tank 14 and to one of said plurality of nozzles 16 by a connector 70 and run between the first and second single-piece component 24 and 30, respectively, of the sprayer boom. This arrangement is generally the same for the first embodiment and the second embodiment of the present invention and can be see in FIGS. 5, 7a and 10. Each one of said plurality of nozzles 16 is mounted so as to deliver liquid through one of said apertures 61–69 yet positioned so that the connector 70 remains mostly within said space 60. In the preferred embodiment, the connector 70 between each nozzle 16 and each hose 18 is fully within said space 60. By this arrangement, said truss structure 39 serves to protect the connectors 70 and nozzles 16 from physical damage and alignment changes and to provide protection of the liquid flow from wind disturbance.

Referring now to FIGS. 1 and 7–11, a second embodiment of the present invention is shown. This embodiment comprises a single-piece component 80 cut from a sheet of metal with two truss structures 82 and 84. The single-piece component 80 is bent in a U-shape with two arms 86 and 88 such that each of said truss structures 82 and 84 runs the length of one arm 86 or 88 and a chasm 90 is formed between the arms 86 and 88. The single-piece component 80 is hung over the carrier beam 36. A plurality of rungs 92–99 are each associated with both arms 86 and 88 of the single-piece component 80 in a spaced apart manner so that apertures 100 through 107 are formed.

Each of said hoses 18 are connected to the tank 14 and to one of said plurality of nozzles 16 by a connector 70 and run between the two arms 86 and 88 through the chasm 90 of the wing section 23. Each one of said plurality of nozzles 16 is mounted so as to deliver liquid through one of said apertures 100–107 yet positioned so that the connector 70 remains mostly within the chasm 90. In the preferred embodiment, the connector 70 between each nozzle 16 and each hose 18 is fully within said chasm 90. By this arrangement, said truss structures 82 and 84 serve to protect the connectors 70 and nozzles 16 from physical damage and alignment changes and to provide protection of the liquid flow from wind disturbance. Rungs 92–99 may be positioned so as to reflect the nozzle positions desired by the user.

In both embodiments it may be desirable to include a lighter and smaller wing section on the outer portions of the boom. These wing sections may be constructed as described in either embodiment but do not require the use of carrier beam 36.

As in prior art spray booms, the wing sections are equipped with hydraulic cylinders and hinged to one another so that they may be folded against the spray cart for ease in transport and storage.

Thus, the present invention has been described in an illustrative manner. It is to be understood that the terminology that has been used is intended to be in the nature of words of description rather than of limitation.

Many modifications and variations of the present invention are possible in light of the above teachings. For example, the truss structure may include openings of any shape. Therefore, within the scope of the appended claims, the present invention may be practiced otherwise than as specifically described.

What I claim is:

1. A sprayer boom for a crop spraying apparatus comprising:
   (a) two wings, each comprising at least one section;
   (b) each of said sections comprising at least one single-piece component having at least one single-piece truss structure cut therein;
   (c) said at least one truss structure includes a plurality of openings:
   (d) a plurality of spray nozzles in a longitudinally spaced apart relationship for spraying liquid and
   (e) means for forming a plurality of apertures through which liquid from said plurality of nozzles can be sprayed.

2. The sprayer boom of claim 1 wherein said single-piece component is U-shaped having two arms and a chasm therebetween.

3. The sprayer boom of claim 2 wherein said chasm is spanned by a plurality of rungs each rung affixed to each of said two arms and spaced apart such that apertures are formed therebetween.

4. The sprayer boom of claim 3 wherein a plurality of hoses is positioned within said chasm and each of said hoses is equipped with a nozzle which is positioned essentially within said chasm and above one of said apertures.

5. The sprayer boom of claim 1 wherein said truss structure comprises a plurality of triangular shaped openings, each in inverted relationship to adjacent triangular openings, therefore leaving angled struts to serve as support.

6. The sprayer boom of claim 3 wherein the spaced apart relationship of each of said plurality of rungs may be adjusted according to the desired position of said nozzles.

7. The sprayer boom of claim 1 wherein each of said sections is formed from two single-piece components.

8. A sprayer boom for a crop spraying apparatus comprising:
   (a) two wings each comprising at least one section;
   (b) each section comprising a first single-piece component having a side surface, a top flange and a bottom flange and a second single-piece component of generally mirror image of said first single-piece component comprising a side surface, a top flange, and a bottom flange and positioned facing said first single-piece component and leaving a space therebetween;
   (c) said bottom flanges of said first and second single-piece components are oriented to said side surface at such an angle as to be generally horizontal and comprising tabs such that said tabs of said first single-piece component overlap with said tabs of said second single-piece component forming apertures between said overlapped tabs;
   (d) means to associate said top flange of said first single-piece component with said top flange of said second single-piece component;
   (e) means to secure said tabs of said first single-piece component in overlapping position with said tabs of said second single-piece component; and
   (f) said side surfaces of said first and second single-piece components each comprising a truss structure, said truss structure including openings thereby leaving portions of said single-piece component to serve as struts.

9. The sprayer boom of claim 8 further comprising a plurality of nozzles which are positioned so as to spray through the apertures formed between said overlapped tabs.

10. The sprayer boom of claim 9 wherein each of said plurality of nozzles is positioned essentially within said space between single-piece components for protection.

11. The sprayer boom of claim 8 further comprising a carrier beam positioned under and secured to said top flanges of each said single-piece component to provide additional strength.

12. The sprayer boom of claim 8 wherein two or more sections per wing are included and one of said sections includes a carrier beam positioned under and secured to said top flanges of each said single-piece component in said section.

13. The sprayer boom of claim 8 wherein said means to associate top flanges comprises welds.

14. The sprayer boom of claim 8 wherein said top flanges further comprise slots and said means to associate said top flanges with said carrier beam comprise welds through said slots.

15. The sprayer boom of claim 8 wherein each of said single-piece components are flame cut to include said openings, said struts, and said tabs and each said single-piece component is bent to form said top flange and said bottom flange.

16. The sprayer boom of claim 8 wherein each of said sections is provided with a hydraulic cylinder and hingedly connected to a vehicle or another said section to facilitate folding for transportation and storage purposes.

17. A sprayer boom for a crop spraying apparatus comprising:
   (a) two wings, each comprising at least one section;
   (b) each of said sections comprising a U-shaped single-piece component having two arms and a chasm therebetween;
   (c) a plurality of rungs;
   (d) means to associate each of said plurality of rungs with each of said arms forming apertures therebetween;
   (e) each of said arms having a truss structure, said truss structure comprising openings cut into said arms of said single-piece component; and
   (f) a plurality of nozzles, each positioned essentially within said chasm and above one of said apertures.

18. The sprayer boom of claim 17 wherein said means to associate said rungs includes nut, bolt and clamp assemblies said assemblies and rungs being adjustable to provide apertures necessary to accommodate the position of one of said plurality of nozzles.

19. The sprayer boo, of claim 17 further comprising a carrier beam which is positioned under the point where the two arms of said U-shaped single-piece component intersect and secured thereto.

* * * * *